(12) United States Patent
Takaori et al.

(10) Patent No.: US 8,523,342 B2
(45) Date of Patent: Sep. 3, 2013

(54) INKJET RECORDING PROCESSING LIQUID AND INKJET RECORDING METHOD USING SUCH PROCESSING LIQUID

(75) Inventors: Yasuko Takaori, Osaka (JP); Noriaki Furukawa, Osaka (JP)

(73) Assignee: Kyocera Mita Corporation (JP)

( * ) Notice: Subject to any disclaimer, the term of this patent is extended or adjusted under 35 U.S.C. 154(b) by 192 days.

(21) Appl. No.: 12/880,238

(22) Filed: Sep. 13, 2010

(65) Prior Publication Data
US 2011/0063362 A1    Mar. 17, 2011

(30) Foreign Application Priority Data

Sep. 14, 2009    (JP) .................................. 2009-211292

(51) Int. Cl.
  *B41J 2/01*    (2006.01)
(52) U.S. Cl.
  USPC .............................. 347/95; 347/100; 347/101
(58) Field of Classification Search
  USPC ............. 347/100, 95, 96, 101, 102; 523/160, 523/161; 106/31.6, 31.13, 31.27
  See application file for complete search history.

(56) References Cited

U.S. PATENT DOCUMENTS

| | | | |
|---|---|---|---|
| 6,328,438 B1 * | 12/2001 | Ozawa | 347/96 |
| 2002/0044185 A1 | 4/2002 | Koitabashi et al. | |
| 2003/0069329 A1 * | 4/2003 | Kubota et al. | 523/160 |
| 2006/0000386 A1 * | 1/2006 | Hakamada et al. | 106/31.13 |
| 2008/0180503 A1 * | 7/2008 | Umebayashi | 347/100 |

FOREIGN PATENT DOCUMENTS

JP    2002-79740    3/2002

OTHER PUBLICATIONS

ICS-Colloidal Silica; MSDS#ICS-007; (Oct. 18, 2005) pp. 1-4; International Casting Supply Inc.*

* cited by examiner

*Primary Examiner* — Manish S Shah
(74) *Attorney, Agent, or Firm* — Gerald E. Hespos; Michael J. Porco; Matthew T. Hespos

(57) ABSTRACT

The present invention provides an inkjet recording processing liquid for use in an inkjet recording method of causing a processing liquid to adhere to a recording medium and thereafter causing ink to adhere to the recording medium to which the processing liquid has adhered. The inkjet recording processing liquid contains water, glycerin, and at least one multivalent metal salt selected from the group consisting of calcium nitrate and magnesium nitrate. The glycerin content in the processing liquid is 10 to 50 mass percent, and the multivalent metal salt content in the processing liquid is 0.8 to 2.0 mol/L.

4 Claims, 2 Drawing Sheets

INKJET RECORDING PROCESSING LIQUID AND INKJET RECORDING METHOD USING SUCH PROCESSING LIQUID

BACKGROUND OF THE INVENTION

1. Field of the Invention

The present disclosure relates to a processing liquid that can be used in an inkjet recording method of forming an image on a recording medium such as paper by discharging ink, which contains at least water and a pigment, onto such recording medium, and to an inkjet recording method that uses the processing liquid.

2. Description of the Related Art

Conventionally, known is an inkjet recording device that causes ink to adhere onto a recording surface of a recording medium such as PPC paper and forms an image by discharging ink, which contains at least water and a pigment, onto such recording medium from an ink discharge opening (nozzle) of an inkjet recording head based on image information that was sent, for example, from another device. Such an inkjet recording device generally comprises a conveyor belt for conveying a recording medium, and the inkjet recording head that is disposed facing the conveyor belt. An image is formed on the recording medium by discharging ink from a plurality of ink discharge openings aligned on the inkjet recording head onto the recording medium while conveying the recording medium on the moving conveyor belt. The recording medium to which ink has adhered and an image is formed is ultimately discharged outside of the inkjet recording device.

With plain paper such as PPC paper, and not a recording medium such as coated paper for use in photo printing or the like in which its recording surface is coated with resin, the pigment contained in the ink that is discharged to the recording medium excessively permeates to the inside of the recording medium. Consequently, there are a problem in that the image density of the image formed on the paper will deteriorate, a problem in that the blurring of the image will increase, and a problem in that the image will strike through. The term "strike through" refers to the phenomenon where the ink (pigment) discharged to the recording medium permeates to the reverse side of the recording medium, and the front-side image appears on the reverse side of the recording medium. This phenomenon will impair duplex printing.

In order to deal with these kinds of problems, for instance, known is a method of, prior to causing ink to adhere to the recording medium, causing to adhere in advance an aqueous solution of multivalent metal salt such as calcium salt or magnesium salt as the processing liquid to the recording medium. Consequently, aggregation of the pigment contained in the ink that was discharged to the recording medium is promoted by reacting with the multivalent metal ions created as a result of the multivalent metal salt dissolving in water on the recording surface, whereby the excessive permeation of the pigment into the recording medium is inhibited. Thus, it is possible to avoid the problem of the image density deteriorating, the problem of the image blurring, and the problem of the image striking through, and it is thereby possible to obtain a high quality image.

In order to improve the effect of the foregoing processing liquid; that is, in order to increase the pigment aggregation promotion effect, the multivalent metal salt content in the processing liquid should be increased. Nevertheless, if the multivalent metal salt content is increased in the processing liquid, there is a problem in that the multivalent metal salt easily precipitates due to the drying of the processing liquid; that is, due to the evaporation of the solvent of the processing liquid. When the multivalent metal salt precipitates, the pigment aggregation promotion effect of the processing liquid will diminish. In addition, if the multivalent metal salt content in the processing liquid increases, there is an additional problem in that the solubility of an organic additive will deteriorate. An organic additive is, for example, an additive as an organic compound such as a viscosity modifier or a surface active agent (as a wetting agent or the like) to be added to the ink or the processing liquid.

SUMMARY OF THE INVENTION

The present disclosure deals with the foregoing problems encountered in an inkjet recording method of causing a processing liquid to adhere to a recording medium and thereafter causing ink to adhere to the recording medium to which the processing liquid has adhered. Accordingly, an object of the present disclosure is to inhibit the drying of the processing liquid, inhibit the precipitation of the multivalent metal salt, and maintain the solubility of the organic additive even if the multivalent metal salt content in the processing liquid increases.

One aspect of the present disclosure relates to an inkjet recording processing liquid for use in an inkjet recording method of causing a processing liquid to adhere to a recording medium and thereafter causing ink to adhere to the recording medium to which the processing liquid has adhered, including water, glycerin, and at least one multivalent metal salt selected from the group consisting of calcium nitrate and magnesium nitrate, wherein the glycerin content in the processing liquid is 10 to 50 mass percent, and the multivalent metal salt content in the processing liquid is 0.8 to 2.0 mol/L.

Another aspect of the present disclosure relates to an inkjet recording method of causing a processing liquid to adhere to a recording medium and thereafter causing ink to adhere to the recording medium to which the processing liquid has adhered, wherein used is a processing liquid including water, glycerin, and at least one multivalent metal salt selected from the group consisting of calcium nitrate and magnesium nitrate, and in which the glycerin content in the processing liquid is 10 to 50 mass percent and the multivalent metal salt content in the processing liquid is 0.8 to 2.0 mol/L.

DETAILED DESCRIPTION OF THE PREFERRED EMBODIMENTS

[Inkjet Recording Processing Liquid]

Figure 1:
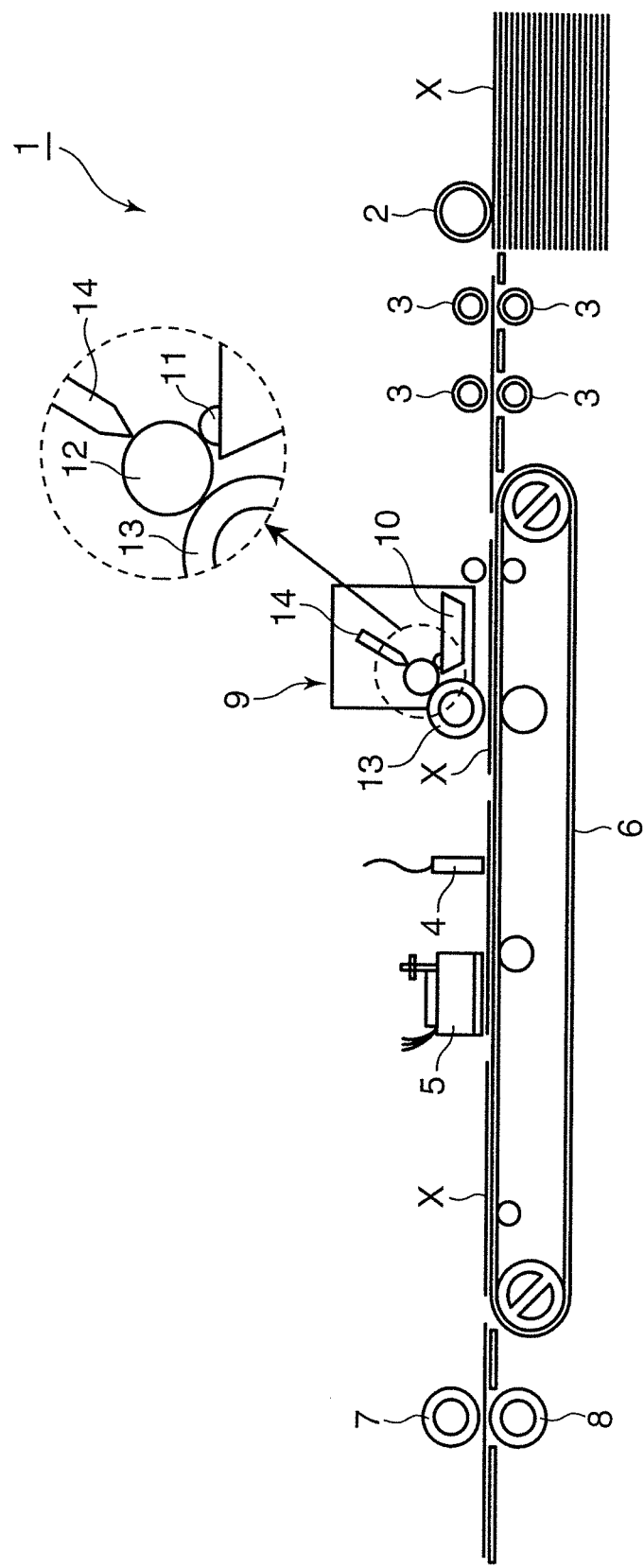
FIG. 1 is a schematic configuration diagram of an inkjet recording device that is suitable for implementing the inkjet recording method according to the present disclosure.

The inkjet recording processing liquid according to an embodiment is a processing liquid for use in an inkjet recording method of causing a processing liquid to adhere to a recording medium and thereafter causing ink to adhere to the recording medium to which the processing liquid has adhered. The processing liquid according to this embodiment includes water, glycerin, and calcium nitrate and/or magnesium nitrate.

The water that is used as the solvent in the processing liquid of this embodiment is preferably purified water. The glycerin, calcium nitrate and/or magnesium nitrate dissolve in the water.

With the processing liquid of this embodiment, glycerin is used as an anti-drying agent. As a result of glycerin being contained in the processing liquid, the drying of the processing liquid is inhibited and, even if the multivalent metal salt content in the processing liquid is relatively great in comparison to conventional cases, the precipitation of the multivalent metal salt can be inhibited even in cases where the processing liquid is exposed to a dry environment. Thus, the effect of the processing liquid; that is, the effect of promoting the aggregation of the pigment that is contained in the ink will not diminish.

With the processing liquid of this embodiment, 10 to 50 mass percent, preferably 20 to 50 mass percent, and more preferably 30 to 50 mass percent of glycerin is contained in the processing liquid. If the glycerin content is less than 10 mass percent, there is a possibility that its effect as an anti-drying agent will be insufficient. If the glycerin content exceeds 50 mass percent, there is a possibility that the solubility of the organic additive in the processing liquid will deteriorate.

With the processing liquid of this embodiment, calcium nitrate and/or magnesium nitrate is used as the multivalent metal salt. Since the metal ions of the multivalent metal salt are calcium ions $Ca^{2+}$ and/or magnesium ions $Mg^{2+}$, it is possible to reliably avoid the problem of the image density deteriorating, the problem of the image blurring, and the problem of the image striking through, and it is thereby possible to reliably obtain a high quality image.

Moreover, since the anions of the multivalent metal salt are nitrate ions $NO_3^-$, even if the multivalent metal salt content in the processing liquid is relatively great in comparison to conventional cases, the solubility of the organic additive will not be impaired.

With the processing liquid of this embodiment, 0.8 to 2.0 mol/L, preferably 1.0 to 2.0 mol/L, and more preferably 1.5 to 2.0 mol/L of multivalent metal salt is contained in the processing liquid. If the multivalent metal salt content is less than 0.8 mol/L, there is a possibility that the pigment aggregation promotion effect of the processing liquid will be insufficient. If the multivalent metal salt content exceeds 2.0 mol/L, there is a possibility that the multivalent metal salt will not fully dissolve in the solvent and become precipitated.

With processing liquid of this embodiment, for example, various types of organic additives (excluding glycerin) such as a polymer dispersant, a surface active agent (as a wetting agent or a surface tension regulator), a water-soluble organic solvent (as a penetration enhancer or an anti-drying agent), a viscosity modifier, an antifoamer, a pH adjuster, or an antiseptic may be added. The content of these organic additives in the processing liquid will vary depending on the type of organic additive, but for instance is 0.1 to 20 mass percent in the processing liquid. Since the multivalent metal salt contained in the processing liquid is calcium nitrate and/or magnesium nitrate and the anions thereof are nitrate ions $NO_3^-$, even if the multivalent metal salt content in the processing liquid is 0.8 to 2.0 mol/L and relatively great in comparison to conventional cases, these organic additives will dissolve favorably in the processing liquid.

As favorable examples of the polymer dispersant to be used in the processing liquid of this embodiment, water-soluble resins such as styrene-acrylic-alkyl acrylate ester copolymer, styrene-acrylic acid copolymer, styrene-maleic acid copolymer, styrene-maleic acid-alkyl acrylate ester copolymer, styrene-methacrylic acid copolymer, styrene-alkyl methacrylate ester copolymer, styrene-maleic acid half ester copolymer, vinylnaphthalene-acrylic acid copolymer, and vinylnaphthalene-maleic acid copolymer can be used. When using these polymer dispersants, one type may be used independently or a combination of two or more types may be used.

The polymer dispersant content in the processing liquid is preferably 0.1 to 10 mass percent, and more preferably 1 to 5 mass percent.

As favorable examples of the surface active agent (as a wetting agent or a surface tension regulator) to be used in the processing liquid of this embodiment, nonionic surface active agents such as polyoxyethylene alkyl ethers, polyoxyethylene alkylaryl ethers, acetylene glycols, and polyoxyethylene-polyoxypropylene block polymers may be used. When using these surface active agents, one type may be used independently or a combination of two or more types may be used.

By adjusting the surface active agent content in the processing liquid, for instance, the surface tension of the processing liquid of this embodiment can be adjusted to an intended value.

As favorable examples of the water-soluble organic solvent (as a penetration enhancer or an anti-drying agent) to be used in the processing liquid of this embodiment, ethylene glycol monobutyl ether, triethylene glycol monomethyl ether, triethylene glycol monobutyl ether, diethylene glycol monomethyl ether, ethylene glycol monomethyl ether, triethylene glycol, hexylene glycol, octanediol, thiodiglycol, 2-butyl-2-ethyl-1,3-propanediol, 3-methyl-1,5-pentanediol, 2-ethyl-2-methyl-1,3-propanediol, 2,4-pentanediol, 1,5-pentanediol, 2,2-dimethyl-1,3-propanediol trimethylolpropane, 2-methyl-1,3-propanediol, diethylene glycol, propylene glycol, 1,3-butanediol, ethylene glycol, polyethylene glycol, 2-pyrrolidone and the like may be used. When using these water-soluble organic solvents, one type may be used independently or a combination of two or more types may be used.

By adjusting the water-soluble organic solvent content in the processing liquid, for instance, the viscosity of the processing liquid of this embodiment can be adjusted to an intended value. The viscosity of the processing liquid can be measured, for example, by using a vibratory viscometer ("SV-10" manufactured by A&D) or the like.

The processing liquid of this embodiment can be prepared by mixing and sufficiently stirring and dissolving the raw materials (water, glycerin, calcium nitrate and/or magnesium nitrate, organic additives excluding glycerin) with a propeller-type stirrer or the like.

The adhesion amount of processing liquid of this embodiment to the recording medium may be changed according to the multivalent metal salt content in the processing liquid. For example, if the multivalent metal salt content is within the range of 0.8 to 2.0 mol/L, the processing liquid is caused to adhere to the recording medium within the range of 0.2 to 1.8 mg, preferably within the range of 0.4 to 1.5 mg, and more preferably within the range of 0.6 to 1.2 mg per 1 $cm^2$ of the recording medium. If the adhesion amount of processing liquid to the recording medium is unduly small, there is a possibility that the pigment aggregation promotion effect of the processing liquid will be insufficient. Contrarily, if the adhesion amount of processing liquid to the recording medium is excessively large, there is a possibility that cockling or curling of the recording medium may occur easily. The term "cockling" refers to the phenomenon where the surface of the paper as the recording medium becomes an uneven corrugated shape due to the processing liquid. The term "curling" refers to the phenomenon where the paper as the recording medium curls due to the processing liquid.

[Ink]

The ink that can be used in this embodiment contains at least water and pigment, and may be variously added with, as needed, for example, a polymer dispersant, a surface active agent (as a wetting agent or a surface tension regulator), a water-soluble organic solvent (as a penetration enhancer or an anti-drying agent), a viscosity modifier, an antifoamer, a pH adjuster, an antiseptic and the like.

As the pigment that can be used in this embodiment, used may be, for example, organic pigments such as insoluble azo pigment, soluble azo pigment, phthalocyanine blue, isoindolinone, quinacridone, dioxazine violet, berinone, and betarine, inorganic pigments such as carbon black and titanium dioxide, and body pigments such as China clay, talc, clay, silious earth, calcium carbonate, barium sulfate, titanium oxide, alumina white, silica, kaolin, and aluminum hydroxide.

More specifically, as the black (K) pigment, for example, used may be carbon blacks (C.I. pigment black 7) such as furnace black, lamp black, acetylene black, and channel black; metals such as copper oxide, iron oxide (C.I. pigment black 11), and titanium oxide; and organic pigments such as aniline black (C.I. pigment black 1). When using the above, depending on the situation, one type may be used independently or a combination of two or more types may be used.

As the yellow (Y) pigment, for example, used may be C.I. pigment yellow 1 (fast yellow G), 3, 12 (disazo yellow AAA), 13, 14, 17, 23, 24, 34, 35, 37, 42 (iron oxide yellow), 53, 55, 74, 81, 83 (disazo yellow HR), 95, 97, 98, 100, 101, 104, 108, 109, 110, 117, 120, 128, 138, 150, 153, and the like. When using the above, depending on the situation, one type may be used independently or a combination of two or more types may be used.

As the magenta (M) pigment, for example, used may be C.I. pigment red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, (rhodamine 6G lake), 83, 88, 92, 101 (rouge), 104, 105, 106, 108 (cadmium red), 112, 114, 122 (dimethyl quinacridone), 123, 146, 149, 166, 168, 170, 172, 177, 178, 179, 185, 190, 193, 209, 219, and the like. When using the above, depending on the situation, one type may be used independently or a combination of two or more types may be used.

As the cyan (C) pigment, for example, used may be C.I. pigment blue 1, 2, 15 (copper phthalocyanine blue R), 15:1, 15:2, 15:3 (phthalocyanine blue G), 15:4, 15:6 (phthalocyanine blue E), 16, 17:1, 56, 60, 63, and the like. When using the above, depending on the situation, one type may be used independently or a combination of two or more types may be used.

The pigment content in the entire ink liquid will change depending on the intended usage. For example, in light of the balance between the coloring power and the viscosity of ink (as the pigment content increases, the viscosity of the ink will increase and it becomes difficult to discharge the ink), the pigment content in the entire ink liquid is 0.1 to 20 mass percent, preferably 1 to 10 mass percent, and more preferably 3 to 7 mass percent.

A water-soluble resin may be added as the polymer dispersant for dispersing the pigment in the ink solvent. As preferable examples of the polymer dispersant, used may be water-soluble resins such as styrene-acrylic-alkyl acrylate ester copolymer, styrene-acrylic acid copolymer, styrene-maleic acid copolymer, styrene-maleic acid-alkyl acrylate ester copolymer, styrene-methacrylic acid copolymer, styrene-alkyl methacrylate ester copolymer, styrene-maleic acid half ester copolymer, vinylnaphthalene-acrylic acid copolymer, and vinylnaphthalene-maleic acid copolymer. When using these polymer dispersants, one type may be used independently or a combination of two or more types may be used.

The polymer dispersant content in the entire ink liquid is preferably 0.1 to 10 mass percent, and more preferably 1 to 5 mass percent.

A ball mill, a sand mill, a roll mill, an agitator, an ultrasonic homogenizer, a wet-type jet mill, a paint shaker and the like may be used for dispersing the pigment in the ink solvent.

A high density pigment dispersion liquid is separately adjusted in advance for preparing the ink of this embodiment. A centrifuge is preferably used upon preparing the high density pigment dispersion liquid in order to eliminate foreign matter, dust, coarse particles and the like during the dispersion. When ultimately preparing the ink of this embodiment, the high density pigment dispersion liquid is preferably filtered with a filter.

The average grain size of the pigment particles that can be used in this embodiment is preferably 30 to 300 nm, more preferably 50 to 150 nm, and most preferably about 100 nm. The average particle size of the pigment can be measured by using, for example, a dynamic light scattering-type particle size distribution analyzer ("LB-550" manufactured by Horiba) or the like. The pigment particle size of the ink will be explained later.

As the surface active agent (as a wetting agent or a surface tension regulator) to be used in the ink in this embodiment, preferably used are nonionic surface active agents such as polyoxyethylene alkyl ethers, polyoxyethylene alkylaryl ethers, acetylene glycols, and polyoxyethylene-polyoxypropylene block polymers. When using these surface active agents, one type may be used independently or a combination of two or more types may be used.

In this embodiment, the intended surface tension of the ink can be obtained by adjusting the additive amount of the surface active agent.

As the water-soluble organic solvent (as a penetration enhancer or an anti-drying agent) to be used in the ink in this embodiment, used may be ethylene glycol monobutyl ether, triethylene glycol monomethyl ether, triethylene glycol monobutyl ether, diethylene glycol monomethyl ether, ethylene glycol monomethyl ether, triethylene glycol, hexylene glycol, octanediol, thiodiglycol, 2-butyl-2-ethyl-1,3-propanediol, 3-methyl-1,5-pentanediol, 2-ethyl-2-methyl-1,3-propanediol, 2,4-pentanediol, 1,5-pentanediol, 2,2-dimethyl-1,3-propanediol trimethylolpropane, 2-methyl-1,3-propanediol, diethylene glycol, propylene glycol, 1,3-butanediol, ethylene glycol, glycerin, 2-pyrrolidone, and the like. When using these water-soluble organic solvents, one type may be used independently or a combination of two or more types may be used.

In this embodiment, the intended viscosity of the ink can be obtained by adjusting the additive amount of the water-soluble organic solvent. The viscosity of the ink can be measured, for example, by using a vibratory viscometer ("SV-10" manufactured by A&D) or the like.

The ink of this embodiment can be prepared by mixing and sufficiently stirring and dissolving the raw materials with a propeller-type stirrer or a wet-type media disperser, and thereafter performing centrifugation or filtration. As the wet-type disperser, for example, when using zirconia beads as media having a media diameter of 0.2 to 1.0 mm, preferably used is a wet-type disperser comprising a mechanism capable of applying optimal dispersive energy to the respective media. For example, preferably used may be "Nano Grain Mill" manufactured by Asada Iron Works, "MSC Mill" manufactured by Mitsui Kozan, "Dyno Mill" manufactured by Shinmaru Enterprises, and so on. Here, as the particle size of the pigment of the high density pigment dispersion liquid, the average particle size is adjusted so that it is preferably within the range of 30 to 300 nm, more preferably within the range of 50 to 150 nm, and most preferably about 100 nm. With respect to the particle size distribution measurement, the ink solution that was diluted 1500 times with ion exchange water can be measured using "Zetasizer Nano" manufactured by Sysmex as the analyzer. The dispersed liquid is subject to a centrifuge to eliminate the coarse particles, whereby the ink is ultimately obtained.

The inkjet recording processing liquid of this embodiment is considered to yield the following effects on the ink. Foremost, generally speaking, the pigments in the inkjet recording ink, regardless of whether it is black (K), yellow (Y), magenta (M) or cyan (C), are coated with a polymer dispersant that consists of styrene-acrylic acid copolymer or the like, and are stably dispersed as pigment particles having a particle size of about 30 to 300 nm based on the electrostatic repulsion between the particles. Meanwhile, in the processing liquid of this embodiment, multivalent metal ions (positive charge cations) such as calcium ions ($Ca^{2+}$) and magnesium ions ($Mg^{2+}$) are generated from the multivalent metal salt such as calcium nitrate and magnesium nitrate. When this kind of processing liquid and the ink are mixed, the electric double layer on the surface of the pigment particles that are dispersed in the ink (more specifically, a boundary layer that is electrically neutral overall as a result of the negative charge on the surface side of the pigment particles and the positive charge on the ink fluid side being continuously distributed at the solid-liquid contact interface of the surface of the pigment particles and the fluid in the ink) is destroyed due to the positive charge of the multivalent metal ions in the processing liquid, the surface of the pigment particles reaches an isoelectric point (that is, the charge of the overall pigment particles becomes zero), the electrostatic repulsion between the pigment particles is lost, and the pigment particles will thereby aggregate. This is the pigment aggregation promotion effect of the processing liquid.

[Inkjet Recording Device]

An example of a specific configuration of an inkjet recording device that is suitable for implementing the inkjet recording method of this embodiment using the inkjet recording processing liquid of this embodiment is now explained.

As shown in FIG. 1, the inkjet recording device 1 of this embodiment is an inkjet printer for forming an image on a recording medium using inkjet recording ink based on the image information that was sent from another device.

The inkjet recording device 1 includes a paper accommodating part for accommodating a recording medium X such as PPC paper in a stacked state in a paper feed cassette not shown. The recording medium X is fed one sheet at a time from the uppermost sheet with the rotation of a paper feed roller 2, and supplied to the paper conveying part by conveying roller pairs 3 . . . 3.

The paper conveying part includes an endless conveyer belt 6 wrapped horizontally between a pair of rollers. The recording medium X that is supplied by the conveying roller pair 3 . . . 3 is conveyed to the image forming part with its recording surface facing upward with the movement of the conveyor belt 6.

The image forming part includes an elongated line-type inkjet recording head 5 having a length that is equal to or greater than the width of the recording medium X that is conveyed with the conveyer belt 6 (width of the recording medium X in a direction that is orthogonal to the conveying direction of the recording medium X) above the conveyor belt 6. The recording head is fixed to a body of the inkjet recording device 1 across a direction that is orthogonal to the conveying direction of the recording medium X. With the recording head 5, a plurality of ink discharge openings (nozzles) as dot forming parts are aligned on the lower surface facing the conveyor belt 6 or the recording medium X as described later. The recording head 5 is able to form an image on the recording medium X at high speed by simultaneously discharging ink across the total width of the recording medium X. With the recording head 5, the distance between the lower surface (nozzle surface) and the recording medium X on the conveyor belt 6 is set to approximately 1 mm.

A recording medium detection sensor 4 for detecting the tip of the recording medium X that is conveyed with the conveyer belt 6 is provided above the conveyor belt 6 in the conveying direction of the recording medium X at a side that is more upstream than the inkjet recording head 5. An ink discharge command is output to the inkjet recording head 5 based on the detection time of the sensor 4.

A processing liquid roll coater 9 for causing the processing liquid to adhere to the recording medium X is provided above the conveyor belt 6 in the conveying direction of the recording medium X at a side that is more upstream than the recording medium detection sensor 4. The roll coater 9 includes a container 10 for storing the processing liquid, a pumping roller for pumping the processing liquid from the container 10, an intermediate roller 12 for receiving the processing liquid from the pumping roller 11, an application roller 13 for receiving the processing liquid from the intermediate roller 12 and applying the processing liquid to the recording surface of the recording medium X on the conveyor belt 6, and a control blade 14 for controlling the amount of processing liquid adhering to the surface of the intermediate roller 12. The roll coater 9 is able to adjust the application amount of processing liquid per unit area of the recording medium X (for instance, causing the processing liquid to adhere to the recording medium at 0.2 to 1.8 mg per 1 $cm^2$ of the recording medium) by adjusting the amount of immersion of the pumping roller 11 in the container 10, the contact pressure between the respective rollers 11, 12, 13, the position of the control blade 14 relative to the intermediate roller 12, and so on.

The recording medium X is adhered with the processing liquid with the processing liquid roll coater 9 while the recording medium X is being conveyed with the conveyor belt 6, and an image is thereafter formed on the recording surface as a result of ink adhering thereto with the inkjet recording head 5. The recording medium X is continuously conveyed with the conveyor belt 6, transferred to the pair of upper and lower discharge rollers 7, at the terminal part of the conveyor belt 6, and thereby discharged from the conveyor belt 6.

Figure 2:
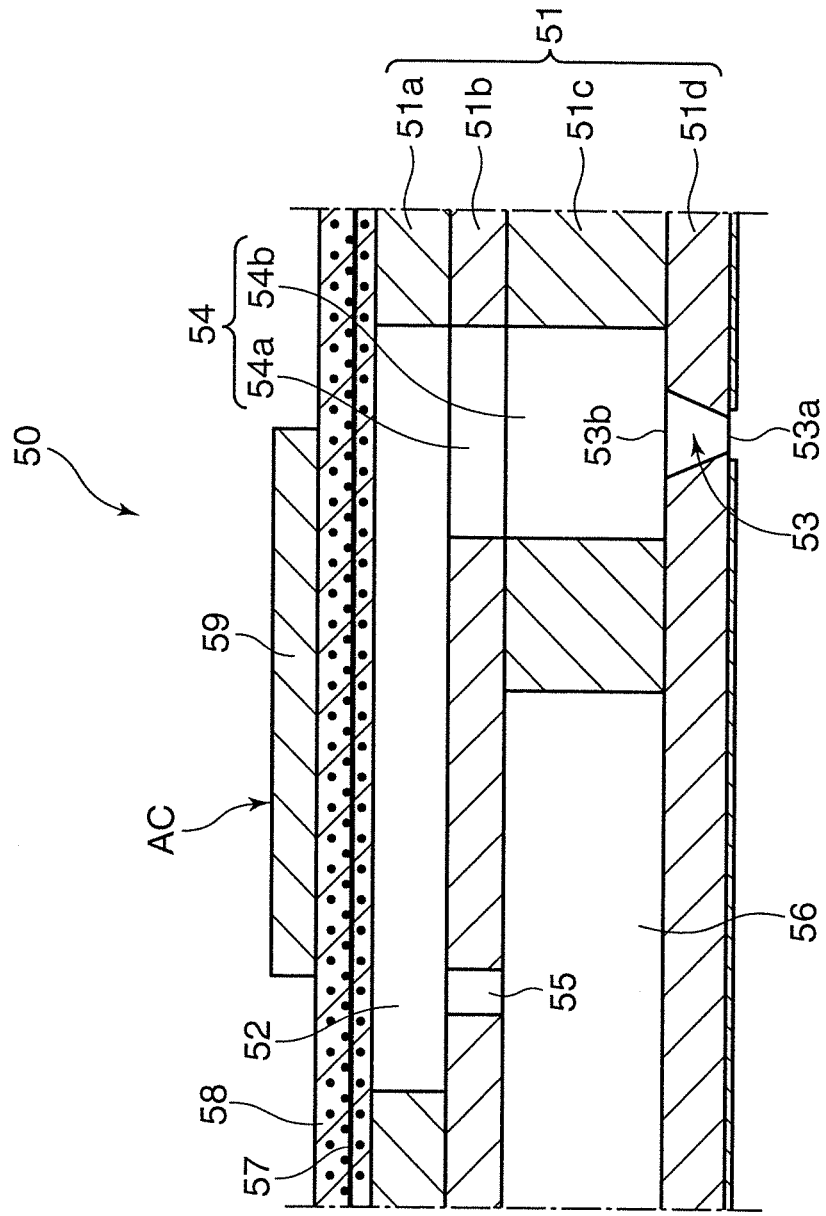
FIG. 2 is an enlarged longitudinal cross section of a dot forming part provided to an inkjet recording head of the inkjet recording device.

FIG. 2 is a longitudinal cross section showing an enlargement of one of the plurality of dot forming parts 50 that are aligned in the inkjet recording head 5 of the inkjet recording device 1.

The recording head 5 is an elongated line-type recording head 5 extending in the width direction of the recording medium X. Although not specifically shown, the recording head 5 is structured such that three sub heads (dividing heads) are sequentially linked in a direction that is orthogonal to the conveying direction of the recording medium X. The respective sub heads are structured such that four trapezoidal (from a planar view) discharge opening clustered areas are sequentially disposed in a direction that is orthogonal to the conveying direction of the recording medium X (so that the upper base and lower base of the trapezoid will alternately face opposite directions) at the lower surface (nozzle surface) thereof. In the respective discharge opening clustered areas, the dot forming part 50 and the nozzle (ink discharge opening) 53 shown in FIG. 2 are arranged in four rows in the conveying direction of the recording medium X. By setting a pitch between the adjacent nozzles 53, 53 in the same row to 150 dpi, and shifting the position of the nozzle 53 between the adjacent rows ¼ of the pitch in the direction that is orthogonal to the conveying direction of the recording medium X, the formation of a 600 dpi image is realized. Since the number of dot forming parts 50 and nozzles 53 per row is 166, 664 nozzles 53 are aligned in entirety of a single discharge opening clustered area (four rows). Accordingly, 7968 (664×4×3) nozzles 53 are provided to the overall recording head 5.

The dot forming part 50 includes an oval (from a planar view) pressure chamber 52, and one end of the pressure chamber 52 is in communication with the nozzle 53 formed at the lower surface of the recording head 5 via a nozzle flow passage 54, and the other end is in communication with an ink common supply route 56 via a throttle passage 55. The nozzle 53 has an inverted frustoconical shape where the diameter of the upper opening 53b is greater than the diameter of the lower opening 53a.

The dot forming part 50 is configured based on the lamination of a first substrate 51a formed with a pressure chamber 52, a second substrate 51b formed with an upper part 54a of the nozzle flow passage 54 and the throttle passage 55, a third substrate 51c formed with a lower part 54b of the nozzle flow passage 54 and the ink common supply route 56, and a fourth substrate 51d formed with the nozzle 53. The substrate 51 of the recording head 5 is provided based on the laminated first to fourth substrates 51a to 51d.

The upper face of the substrate 51 includes a piezoelectric actuator AC configured by laminating a laminar piezoelectric element 58 which internally includes a common electrode 57, and an individual electrode 59 corresponding to the pressure chamber 52 of the respective dot forming parts 50. A pressure wave is transferred to the ink in the pressure chamber 52 as a result of the piezoelectric actuator AC being driven, the ink in the nozzle flow passage 54 and the nozzle 53 is oscillated due to the pressure wave, and the ink is discharged from the lower opening 53a of the nozzle 53 onto the recording medium X.

Here, an example of the specific numerical values that are preferred for the specification of the dot forming part 50 is shown below.

Area of the pressure chamber 52: 0.2 mm$^2$
Width of the pressure chamber 52: 200 μm
Depth of the pressure chamber 52: 100 μm
Length of the nozzle 53: 30 μm
Radius of the lower opening 53a of the nozzle 53: 10 μm
Diameter of the nozzle flow passage 54: 200 μm
Length of the nozzle flow passage 54: 800 μm
Diameter of the throttle passage 55: 30 μm
Length of the throttle passage 55: 40 μm The inkjet recording device 1 illustrated in FIG. 1 had a single recording head 5 and formed an image with a plain color. Nevertheless, without limitation to this kind of configuration, for example, a plurality of (four) separate recording heads 5 for each K (black) ink, Y (yellow) ink, M (magenta) ink and C (cyan) ink may be arranged in the conveying direction of the recording medium X to form a full color image.

Moreover, the inkjet recording device 1 may include a serial-type recording head (type in which the recording head performs the scanning) in substitute for the line-type recording head.

[Inkjet Recording Method]

The inkjet recording method of this embodiment can be implemented by using the inkjet recording device 1 configured as described above, filling the processing liquid of this embodiment in the roll coater 9, and filling the ink containing the pigment in the recording head 5. Specifically, the inkjet recording method is a method of applying the processing liquid of this embodiment with the roll coater 9 and causing the processing liquid to adhere to the recording surface of the recording medium X while conveying the recording medium X with the conveyor belt 6, and thereafter discharging the ink containing the pigment from the recording head 5 and causing the ink to adhere to the recording medium X.

EXAMPLES

This embodiment is now explained in further detail based on both the Examples and Comparative Examples of this embodiment, but this embodiment is not limited to the following Examples.

[Preparation of Ink]

Foremost, a high density pigment dispersion liquid to be used in preparing the ink was prepared using the following composition.

Pigment: 20 mass percent of C.I. pigment blue 15:3 (cyan-based phthalocyanine compound)
Polymer dispersant: 5 mass percent of styrene-acrylic resin ("JONCRYL 683" manufactured by Johnson)
Anti-drying agent: 10 mass percent of glycerin
Solvent: 65 mass percent of ion exchange water "Nano Grain Mill" (wet-type media disperser using zirconia beads having a diameter of 0.2 mm as the media) manufactured by Asada Iron Works was used to mix the raw materials and disperse the raw materials in the solvent so that the average particle size of the pigment particles after the dispersion treatment will be 100 nm. After the dispersion treatment, centrifugation was performed to eliminate the coarse particles, and the pigment dispersion liquid was thereby obtained. Upon measuring the solution in which the obtained pigment dispersion liquid was diluted 1500 times with ion exchange water with a dynamic light scattering-type particle size distribution analyzer ("LB-550" manufactured by Horiba), the average particle size of the pigment particles was 78 nm.

Subsequently, the obtained pigment dispersion liquid was used to prepare the ink according to the following proportion.

25 mass percent of the foregoing cyan pigment dispersion liquid
Surface active agent (or a wetting agent or a surface tension regulator): 0.5 mass percent of 2,4,7,9-tetramethyl-5-decyne-4,7-diol di[polyoxyethylene] ether ("Olfin (registered trademark) E1010" manufactured by Nissin Chemical Industry
Penetration enhancer: 5 mass percent of hexylene glycol
Anti-drying agent: 5 mass percent of 2-pyrrolidone
Anti-drying agent: 13 mass percent of glycerin
Solvent: 51.5 mass percent of purified water The foregoing raw materials were stirred with "Polymix Stirrer PX-SR90E," a propeller-type stirrer manufactured by Central Scientific Commerce, at 500 rpm for 60 minutes at normal temperature, and thereafter filter pressed with a filter having a pore diameter of 5 μm to obtain the inkjet recording ink.

[Preparation of Processing Liquid]

The processing liquids of Examples 1 to 6 and Comparative Examples 1 to 7 were prepared with the composition shown in Table 1. The "viscosity modifier" and the "surface active agent" shown in Table 1 were as follows.

Viscosity modifier: Polyethylene glycol ("Macrogoal 200" manufactured by NOF Corporation)

Surface active agent: Acetylene glycol derivative having the structure shown in Formula 1 ("Surfynol (registered trademark) 485" manufactured by Nissin Chemical Industry: used as a wetting agent)

(Formula 1)

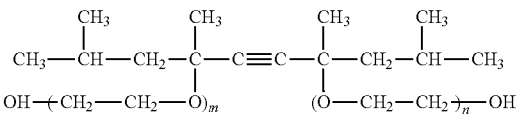

m, n: 1~5 (m+n=2~6)

These raw materials were sufficiently stirred and dissolved at normal temperature using "Polymix Stirrer PX-SR90E," a propeller-type stirrer manufactured by Central Scientific Commerce, to obtain the processing liquids of Examples 1 to 6 and Comparative Examples 1 to 7.

Examples 1 to 6 are a processing liquid in which the glycerin content in the processing liquid is within the range of 10 to 50 mass percent, and the multivalent metal salt is calcium nitrate or magnesium nitrate with its content in the processing liquid within the range of 0.8 to 2.0 mol/L.

Meanwhile, Comparative Example 1 is a processing liquid in which the glycerin content is less than 10 mass percent (7.3 mass percent). Comparative Example 2 is a processing liquid in which the multivalent metal salt (calcium nitrate) content is less than 0.8 mol/L (0.5 mol/L). Comparative Example 3 is a processing liquid in which the multivalent metal salt (calcium nitrate) content exceeds 2.0 mol/L (2.5 mol/L). Comparative Example 4 is a processing liquid in which the anions of the multivalent metal salt are not nitrate ions, and are bromine ions. Comparative Example 5 is a processing liquid in which the metal ions are neither calcium ions nor magnesium ions, and are sodium ions. Comparative Example 6 is a processing liquid in which the anions of the multivalent metal salt are not nitrate ions, and are chlorine ions. Comparative Example 7 is a processing liquid in which the glycerin content exceeds 50 mass percent (60 mass percent).

The following evaluations were performed using the obtained inkjet recording processing liquid and ink. The results are shown in Table 2. In Table 2, the Reference Example is a case of causing only ink to adhere to the recording medium without causing the processing liquid to adhere to the recording medium. With the Reference Example, only the image density, blurring, and strike through were evaluated.

[Image Density]

Using the roll coater 9 of the inkjet recording device 1 shown in FIG. 1, a processing liquid in an amount corresponding to 14 pL per pixel was applied and caused to adhere to the entire area of 10 cm×10 cm on the recording medium (A4-size PPC paper ("V938" manufactured by Fuji Xerox)). One minute after applying the processing liquid, ink in an amount corresponding to 14 pL per pixel was discharged to the same recording medium to form a solid image on the foregoing area of 10 cm×10 cm to which the processing liquid has adhered. The density of the formed solid image was measured using "SpectroEye LT," a reflection densitometer manufactured by GretagMacbeth, a plurality of times, and an average value of a plurality of the measured density was obtained as Image density. As the evaluation, an image density of 1.25 or higher was considered successful, and less than 1.25 was considered unsuccessful.

[Blurring]

The edge part of the solid image that was used for measuring the foregoing image density was evaluated using the Da6000 image evaluator manufactured by Oji Scientific Instruments a plurality of times, and an average value of a plurality of the evaluated value was obtained as Blurring, and evaluated according to the following criteria.

○: Blurring is less than 55 μm
Δ: Blurring is 55 μm or more and less than 65 μm
x: Blurring is 65 μm or more

[Strike Through]

The density of the reverse side of the solid image that was used for measuring the foregoing image density was measured using "SpectroEye LT," a reflection densitometer manufactured by GretagMacbeth, a plurality of times, and an average value of a plurality of the measured density was obtained as Strike through, and evaluated according to the following criteria.

TABLE 1

| | PROCESSING LIQUID COMPOSITION | | | | | | |
|---|---|---|---|---|---|---|---|
| | GLYCERIN (MASS PERCENT) | METAL SALT (MASS PERCENT) (MOL/L) | PURIFIED WATER (MASS PERCENT) | VISCOSITY MODIFIER (MASS PERCENT) | SURFACE ACTIVE AGENT (MASS PERCENT) | METAL SALT | |
| | | | | | | METAL IONS | ANIONS |
| EXAMPLE 1 | 22.2 | 26.3/1.5 | 39.8 | 11.0 | 0.7 | $Ca^{2+}$ | $NO_3^-$ |
| EXAMPLE 2 | 21.7 | 27.8/1.5 | 39.0 | 10.8 | 0.7 | $Mg^{2+}$ | $NO_3^-$ |
| EXAMPLE 3 | 25.2 | 16.0/0.8 | 45.4 | 12.6 | 0.8 | $Ca^{2+}$ | $NO_3^-$ |
| EXAMPLE 4 | 20.2 | 32.3/2.0 | 36.6 | 10.2 | 0.7 | $Ca^{2+}$ | $NO_3^-$ |
| EXAMPLE 5 | 14.7 | 26.3/1.5 | 47.3 | 11.0 | 0.7 | $Ca^{2+}$ | $NO_3^-$ |
| EXAMPLE 6 | 36.9 | 26.3/1.5 | 25.1 | 11.0 | 0.7 | $Ca^{2+}$ | $NO_3^-$ |
| COMPARATIVE EXAMPLE 1 | 7.3 | 26.3/1.5 | 54.7 | 11.0 | 0.7 | $Ca^{2+}$ | $NO_3^-$ |
| COMPARATIVE EXAMPLE 2 | 26.8 | 10.7/0.5 | 48.2 | 13.4 | 0.9 | $Ca^{2+}$ | $NO_3^-$ |
| COMPARATIVE EXAMPLE 3 | 18.8 | 37.3/2.5 | 33.9 | 9.4 | 0.6 | $Ca^{2+}$ | $NO_3^-$ |
| COMPARATIVE EXAMPLE 4 | 22.2 | 26.3/1.5 | 39.8 | 11.0 | 0.7 | $Ca^{2+}$ | $Br^-$ |
| COMPARATIVE EXAMPLE 5 | 26.8 | 10.7/1.5 | 48.2 | 13.4 | 0.9 | $Na^+$ | $NO_3^-$ |
| COMPARATIVE EXAMPLE 6 | 23.0 | 23.4/1.5 | 41.4 | 11.5 | 0.7 | $Mg^{2+}$ | $Cl^-$ |
| COMPARATIVE EXAMPLE 7 | 60.0 | 26.3/1.5 | 2.0 | 11.0 | 0.7 | $Ca^{2+}$ | $NO_3^-$ |

◯: Image density is less than 0.17
Δ: Image density is 0.17 or more and less than 0.25
x: Image density is 0.25 or more

[Dryness Factor]

100 mL of the processing liquid was placed in a plastic container having an opening area of 20 cm² and a capacity of 100 mL, and left for 48 hours in a constant temperature, constant humidity bath under an environment of 25° C. temperature and 15% humidity. The amount of reduction in the volume of the processing liquid before and after being left unattended "volume (100 mL) before being left unattended−volume after being left unattended" was measured, the percentage (%) of the amount of reduction relative to the volume (100 mL) of the processing liquid before being left unattended was obtained as the dryness factor (decrease ratio), and evaluated according to the following criteria.

◯: Dryness factor is less than 10%
x: Dryness factor is 10% or more

[Organic Additive Solubility]

100 mL of the processing liquid was placed in a plastic container having an opening area of 30 cm² and a capacity of 100 mL, and the state of the processing liquid after being left for 24 hours in a 60° C. oven was determined visually. If the processing liquid did not become separate it was considered successful (◯), and if the processing liquid became separated it was considered unsuccessful (x).

TABLE 2

| | IMAGE DENSITY | BLURRING | STRIKE THROUGH | DRYNESS FACTOR | ORGANIC ADDITIVE SOLUBILITY |
|---|---|---|---|---|---|
| EXAMPLE 1 | 1.30 | ◯ | ◯ | ◯ | ◯ |
| EXAMPLE 2 | 1.40 | ◯ | ◯ | ◯ | ◯ |
| EXAMPLE 3 | 1.25 | ◯ | ◯ | ◯ | ◯ |
| EXAMPLE 4 | 1.41 | ◯ | ◯ | ◯ | ◯ |
| EXAMPLE 5 | 1.30 | ◯ | ◯ | ◯ | ◯ |
| EXAMPLE 6 | 1.45 | ◯ | ◯ | ◯ | ◯ |
| COMPARATIVE EXAMPLE 1 | 1.28 | ◯ | ◯ | X | ◯ |
| COMPARATIVE EXAMPLE 2 | 1.08 | X | X | ◯ | ◯ |
| COMPARATIVE EXAMPLE 3 | 1.48 | ◯ | ◯ | ◯ | X |
| COMPARATIVE EXAMPLE 4 | 1.16 | ◯ | Δ | ◯ | X |
| COMPARATIVE EXAMPLE 5 | 1.10 | X | X | ◯ | ◯ |
| COMPARATIVE EXAMPLE 6 | 1.20 | Δ | Δ | ◯ | X |
| COMPARATIVE EXAMPLE 7 | 1.30 | ◯ | ◯ | ◯ | X |
| REFERENCE EXAMPLE | 1.00 | X | X | | |

As evident from Table 2, Examples 1 to 6 that contain 10 to 50 mass percent of glycerin and 0.8 to 2.0 mol/L of calcium nitrate or magnesium nitrate showed favorable results in all items; namely, image density, blurring, strike through, dryness factor, and organic additive solubility.

Meanwhile, Comparative Examples 2, 4, 5, 6 showed inferior image density results (unsuccessful: image density was less than 1.25). Thus, it is obvious that the image density will deteriorate if the metallic salt content is less than 0.8 mol/L (Comparative Example 2), if the anions of the metallic salt are bromine ions (Comparative Example 4), if the metal ions of the metallic salt are sodium ions (Comparative Example 5), and if the anions of the metallic salt are chlorine ions (Comparative Example 6).

Moreover, Comparative Examples 2, 5, 6 showed inferior blurring results. Thus, it is obvious that the blurring will increase if the metallic salt content is less than 0.8 mol/L (Comparative Example 2), if the metal ions of the metallic salt are sodium ions (Comparative Example 5), and if the anions of the metallic salt are chlorine ions (Comparative Example 6).

In addition, Comparative Examples 2, 4, 5, 6 show inferior strike through results. Thus, it is obvious that the strike through will increase if the metallic salt content is less than 0.8 mol/L (Comparative Example 2), if the anions of the metallic salt are bromine ions (Comparative Example 4), if the metal ions of the metallic salt are sodium ions (Comparative Example 5), and if the anions of the metallic salt are chlorine ions (Comparative Example 6).

Furthermore, Comparative Example 1 showed inferior dryness factor results. Thus, it is obvious that the dryness factor will increase if the glycerin content is less than 10 mass percent. If the dryness factor increases, the possibility of the metallic salt precipitating will increase, and there will be a greater tendency of the pigment aggregation promotion effect of the processing liquid diminishing.

Moreover, Comparative Examples 3, 4, 6, 7 showed inferior organic additive solubility results. Thus, it is obvious that the organic additive solubility will deteriorate if the metallic salt content exceeds 2.0 mol/L (Comparative Example 3), if the anions of the metallic salt are not nitrate ions, and are bromine ions (Comparative Example 4), if the anions of the metallic salt are not nitrate ions, and are chlorine ions (Comparative Example 6), and if the glycerin content exceeds 50 mass percent (Comparative Example 7).

As explained in detail based on the foregoing specific examples, the present disclosure inhibits the drying of the processing liquid for use in an inkjet recording method of causing a processing liquid to adhere to a recording medium and thereafter causing ink to adhere to the recording medium to which the processing liquid has adhered. The present disclosure yields significant advantages of being able to inhibit the precipitation of the multivalent metal salt and maintain the solubility of the organic additive even if the multivalent metal salt content in the processing liquid increases.

In other words, the foregoing embodiment provides an inkjet recording processing liquid for use in an inkjet recording method of causing a processing liquid to adhere to a recording medium and thereafter causing ink to adhere to the recording medium to which the processing liquid has adhered, including water, glycerin, and at least one multivalent metal salt selected from the group consisting of calcium nitrate and magnesium nitrate, wherein the glycerin content in the processing liquid is 10 to 50 mass percent, and the multivalent metal salt content in the processing liquid is 0.8 to 2.0 mol/L.

The foregoing embodiment additionally provides an inkjet recording method of causing a processing liquid to adhere to a recording medium and thereafter causing ink to adhere to the recording medium to which the processing liquid has adhered, wherein used is a processing liquid including water, glycerin, and at least one multivalent metal salt selected from the group consisting of calcium nitrate and magnesium nitrate, and in which the glycerin content in the processing liquid is 10 to 50 mass percent and the multivalent metal salt content in the processing liquid is 0.8 to 2.0 mol/L.

With the foregoing embodiment, foremost, since the metal ions of the multivalent metal salt contained in the processing liquid are calcium ions and/or magnesium ions, it is possible to reliably avoid the problem of the image density deteriorating, the problem of the image blurring, and the problem of the image striking through, and it is thereby possible to reliably obtain a high quality image. In addition, since 10 to 50 mass percent of glycerin as an anti-drying agent is contained in the processing liquid, the drying of the processing liquid is inhibited and, even if the multivalent metal salt content in the processing liquid is 0.8 to 2.0 mol/L and relatively great in comparison to conventional cases, the precipitation of the multivalent metal salt can be inhibited, and the effect of promoting the aggregation of the pigment due to the processing liquid will not diminish. Moreover, since the anions of the multivalent metal salt contained in the processing liquid are nitrate ions, even if the multivalent metal salt content in the processing liquid is 0.8 to 2.0 mol/L and relatively great in comparison to conventional cases, the solubility of the organic additive in the processing liquid will not be impaired.

The present disclosure is effective in inhibiting the deterioration in image density, blurring and strike through of the formed image by causing the processing liquid of the present disclosure to adhere to the recording medium prior to causing ink to adhere to the recording medium in an inkjet recording method including the step of forming an image by causing ink to adhere to the recording medium. The present disclosure is also superior in the sustainability of the foregoing effects. In addition, the present disclosure is also superior in the sustainability of the solubility of the organic additive.

This application is based on Japanese Patent application serial No. 2009-211292 filed in Japan Patent Office on Sep. 14, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An inkjet recording method, comprising:
providing a processing liquid which comprises water, glycerin, at least one multivalent metal salt selected from the group consisting of calcium nitrate and magnesium nitrate, and a water-soluble resin as a polymer dispersant, and in which the glycerin content in the processing liquid is 10 to 50 mass percent, the multivalent metal salt content in the processing liquid is 0.8 to 2.0 mol/L, and the polymer dispersant content in the processing liquid is 0.1 to 10 mass percent;
causing the processing liquid to adhere to a recording medium at 0.2 to 1.8 mg per 1 $cm^2$ of the recording medium in order to cause the multivalent metal salt to adhere to the recording medium at 0.8 mol per 1 L of the processing liquid×0.2 mg of the processing liquid per 1 $cm^2$ of the recording medium to 2.0 mol per 1 L of the processing liquid×1.8 mg of the processing liquid per 1 $cm^2$ of the recording medium; and
causing ink to adhere to the recording medium to which the processing liquid has adhered.

2. The inkjet recording method according to claim 1, wherein 0.1 to 20 mass percent of an organic additive is contained in the processing liquid.

3. The inkjet recording method according to claim 1, wherein the processing liquid is caused to adhere to the recording medium at 0.4 to 1.5 mg per 1 $cm^2$ of the recording medium in order to cause the multivalent metal salt to adhere to the recording medium at 0.8 mol per 1 L of the processing liquid×0.4 mg of the processing liquid per 1 $cm^2$ of the recording medium to 2.0 mol per 1 L of the processing liquid×1.5 mg of the processing liquid per 1 $cm^2$ of the recording medium.

4. The inkjet recording method according to claim 1, wherein the processing liquid is caused to adhere to the recording medium at 0.6 to 1.2 mg per 1 $cm^2$ of the recording medium in order to cause the multivalent metal salt to adhere to the recording medium at 0.8 mol per 1 L of the processing liquid×0.6 mg of the processing liquid per 1 $cm^2$ of the recording medium to 2.0 mol per 1 L of the processing liquid×1.2 mg of the processing liquid per 1 $cm^2$ of the recording medium.

* * * * *